United States Patent [19] [11] 3,732,011
Hansard [45] May 8, 1973

[54] APPARATUS FOR CONTROLLING THE EXPOSURE OF LIGHT SENSITIVE MATERIAL

[76] Inventor: Cyril Hansard, 84 Harlow Terrace, Harrogate, England

[22] Filed: Sept. 17, 1971

[21] Appl. No.: 181,472

[30] Foreign Application Priority Data

Sept. 24, 1970 Great Britain....................45,483/70

[52] U.S. Cl. ....................355/68, 355/69, 95/10 CE
[51] Int. Cl. ..........................................G03b 27/76
[58] Field of Search......................95/10 CE, 10 CT; 355/68, 69

[56] References Cited

UNITED STATES PATENTS

| | | | |
|---|---|---|---|
| 3,611,159 | 10/1971 | Florsheim Jr. | 95/10 CT |
| 3,521,952 | 7/1970 | Nelson et al. | 355/68 |
| 3,298,296 | 1/1967 | Mey | 355/68 |
| 3,482,916 | 12/1969 | Mey et al. | 355/68 |
| 3,545,858 | 12/1970 | Childers | 355/68 |

*Primary Examiner*—Samuel S. Matthews
*Assistant Examiner*—Russell E. Adams, Jr.
*Attorney*—Stevens, Davis, Miller & Mosher

[57] ABSTRACT

Apparatus for controlling the exposure of a photosensitive material to light. The apparatus includes an electrical pulsing circuit capable of producing voltage pulses, a photocell responsive to the intensity of the light to control the pulsing circuit so that the frequency of the pulses is dependent on the intensity of the light, a capacitor which is manually adjustable to a predetermined value in accordance with the quantity of light needed for desired exposure of the material, a control resistor, through which the pulses may be applied to charge the capacitor, which is manually adjustable in accordance with a given parameter, a manually operable switch for initiating exposure of the material to light and simultaneously for commencing charging of the capacitor through the control resistor by the pulses, and a trigger which is operative to stop the exposure when the charge in said capacitor reaches the predetermined value.

The control resistor may be manually adjustable in accordance with highlight or shadow density of graphic matter to be copied. Also, apparatus with interlinked adjustment for both these parameters is described, such apparatus being capable of controlling exposure for half tone and line negatives. Apparatus with highlight density control only for controlling exposure in contact printing boxes is also described.

29 Claims, 7 Drawing Figures

APPARATUS FOR CONTROLLING THE EXPOSURE OF LIGHT SENSITIVE MATERIAL

This invention relates to apparatus for controlling the exposure of a photosensitive material to light. The exposure control apparatus of the invention may find application in the preparation of half tone and line negatives in a process camera and in the control of exposure in a contact printing box. Use of the apparatus is not limited to these applications, however, and the apparatus may be used generally wherever control of light falling on a photosensitive material is required.

When graphic matter is to be copied by preparation of a line negative or half tone negative it is necessary to determine the lightest and darkest shades which it is required to reproduce distinctively (the highlight and shadow densities respectively). These densities are generally determined either by visual comparison with a standard density shade card or by a reflection densitometer, and it is then necessary to determine the optimum exposures needed to reproduce distinctively these highlight and shadow densities on the negative. As the negative is conventionally given two exposures, a primary exposure to graphic matter to be copied and a subsequent flash exposure it is necessary to calculate both exposure times having regard to the highlight and shadow densities and also to other intrinsic characteristics of the camera, lighting and photosensitive material used. Various techniques are known for making the necessary calculations involving trial exposures and calculation using computers, but considerable time and expertise are necessary in arriving at the correct figures, and it is recognized that the work of a process camera operator is highly skilled.

The object of the present invention is to provide automatic means for controlling light exposure so that good results can be obtained more consistently than with the present methods.

According to the present invention apparatus for controlling the exposure of a photosensitive material to light comprises an electrical pulsing circuit capable of producing voltage pulses, a photocell responsive to the intensity of the light to control the pulsing circuit so that the frequency of the pulses is dependent on the intensity of the light, a capacitor which is manually adjustable to a predetermined value in accordance with the quantity of light needed for desired exposure of the material, a control resistor through which said pulses may be applied to charge said capacitor, said control resistor being manually adjustable in accordance with a given parameter, manually operable switching means to initiate exposure of said material to light and simultaneously to commence charging of said capacitor through said control resistor by said pulses, and trigger means operative to stop said exposure when the charge in said capacitor reaches said predetermined value.

It will be seen that, using the aforesaid apparatus, after setting the capacitor in accordance with the quantity of light needed for the desired exposure it is only necessary to operate the switching means to commence the exposure. When the capacitor becomes charged to the set value the trigger means is operated to stop the exposure, and the light that has been received by the photosensitive material will be that needed for correct exposure. The apparatus thus automatically compensates for any variation such as ageing of the lamps, distance of light source from copy, angle of lights and mains voltage fluctuation.

The apparatus of the invention may, in one form, be specifically designed to control primary exposure in a process camera, and the parameter according to which said first control resistor is manually adjusted is then the highlight density of the graphic matter to be copied.

Another use of the apparatus is in controlling flash exposure in a process camera, and in this case the parameter according to which said first control resistor is manually adjusted is the excess density of the graphic matter to be copies.

In this specification the term "excess density" is to be understood as the difference between the density range of the graphic matter to be copied and the basic density of the photosensitive material. The density range is the difference between the shadow and highlight densities of the graphic matter, and the basic density is the density which the photosensitive material is capable of reproducing without flash exposure.

For controlling a process camera both the primary and flash exposures are preferably controlled by apparatus according to the invention and the apparatus then comprises a first electrical pulsing circuit capable of producing voltage pulses, a first photocell responsive to the intensity of the light during primary exposure to control the first pulsing circuit so that the frequency of the pulses is dependent on the intensity of the light, a first control resistor for said first pulsing circuit, said first control resistor being manually adjustable in accordance with the highlight density of graphic matter to be copied to shape the pulses in a train of output pulses from said first pulsing circuit; a second pulsing circuit capable of producing voltage pulses of duration compatible with those produced by the first pulsing circuit, a second photocell responsive to the intensity of light during flash exposure to control the second pulsing circuit so that the frequency of the pulses is dependent on the intensity of the flash light, a second control resistor for said second pulsing circuit, said second control resistor being manually adjustable in accordance with the excess density of the graphic matter to shape the pulses in a train of output pulses from said second pulsing circuit; a capacitor which is manually adjustable to a predetermined value in accordance with the quantity of light needed for desired exposure of the material, switch means for selecting the shaped train of output pulses from either said first or said second pulsing circuit to charge said capacitor, manually operable switching means to initiate exposure of said material to light and simultaneously to commence charging of said capacitor by the selected train of output pulses, and trigger means operative to stop said exposure when the charge in said capacitor reaches said predetermined value.

Preferably the first electrical pulsing circuit includes a circuit element which is manually adjustable in accordance with the required magnification or reduction of the graphic matter to control the shape of the voltage pulses produced by the first pulsing circuit.

When a magnified or reduced image of the graphic matter is required an increase or reduction of the amount of light falling on the film is necessary and this circuit element, which is conveniently a variable resistor, gives the necessary control.

In order that the invention may be better understood a specific embodiment thereof will now be described, by way of example only, with reference to the accompanying drawings in which.

Figure 1:
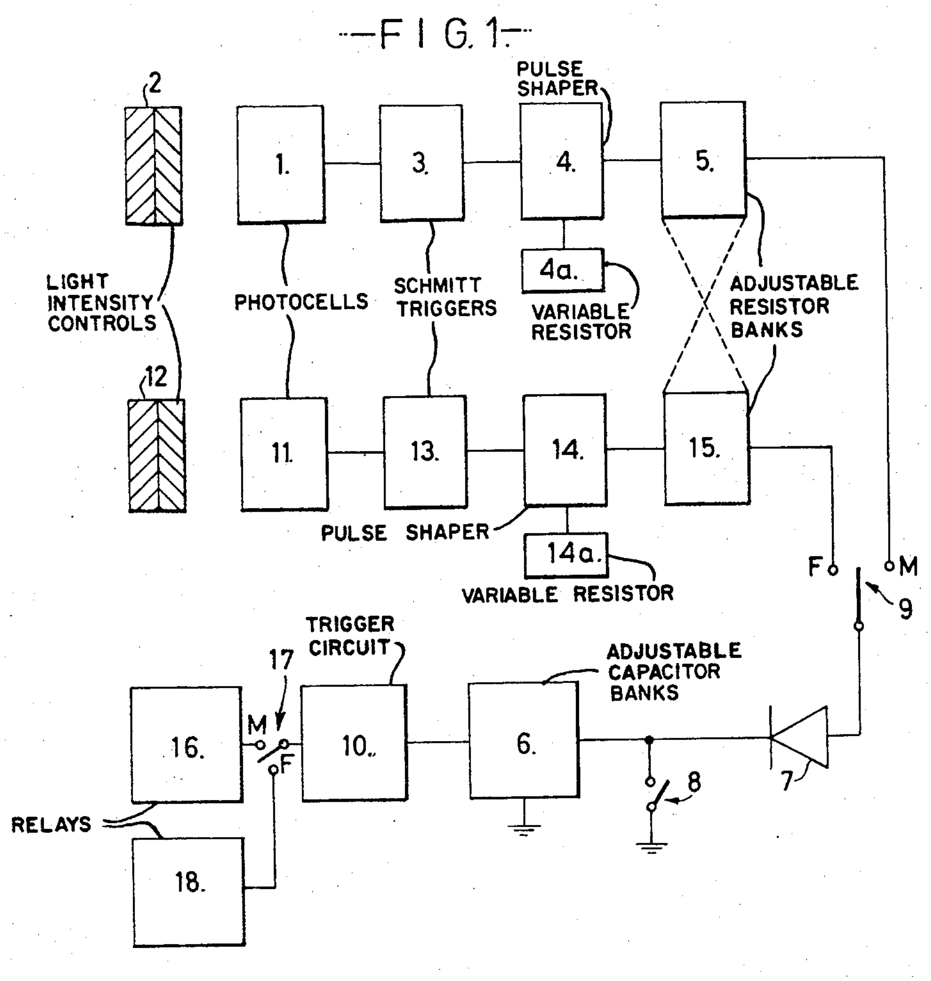
FIG. 1 is a block diagram of an exposure controller according to the invention.
Figure 2:
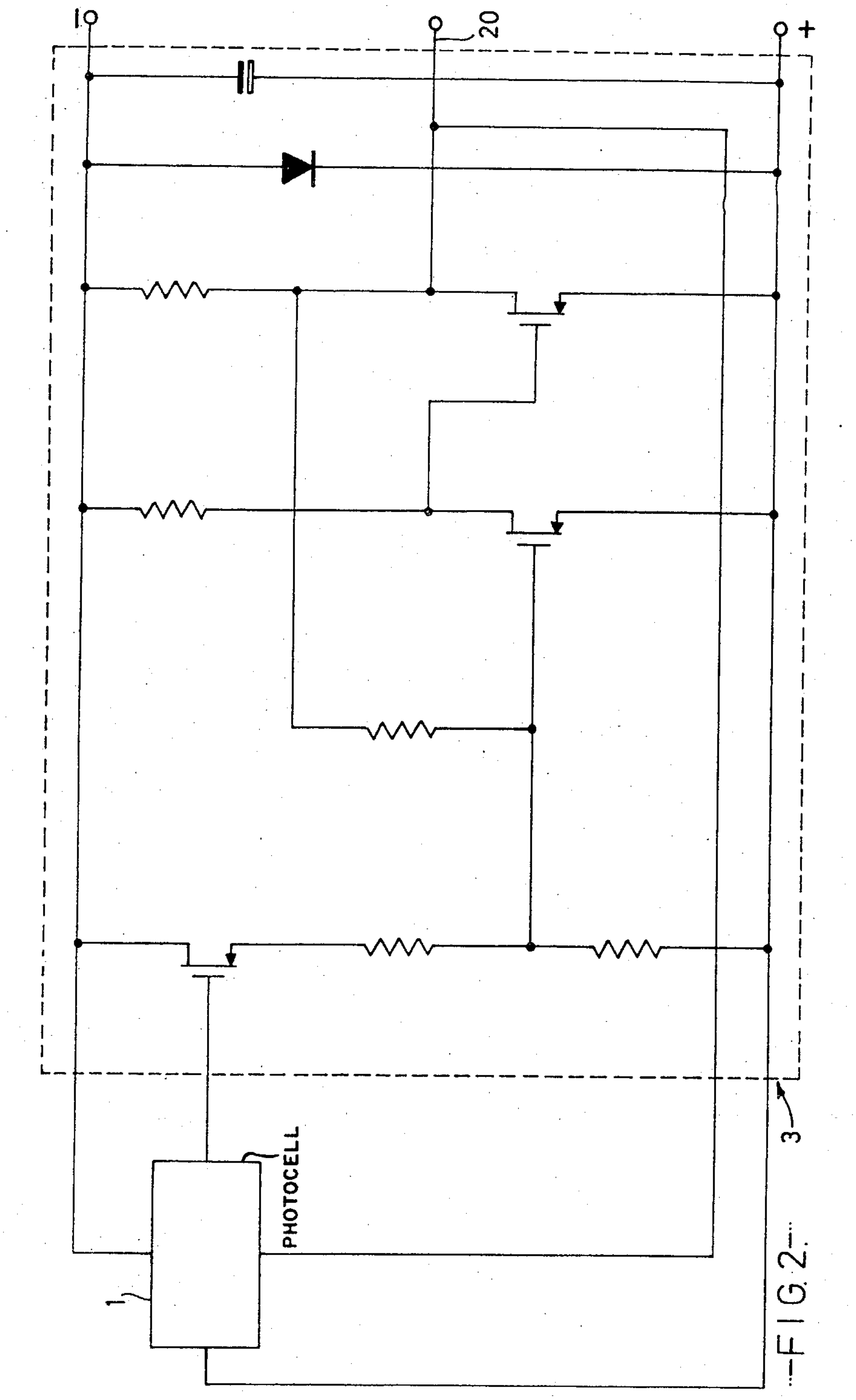
FIG. 2 is a circuit diagram showing certain of the elements of FIG. 1.
Figure 3A:
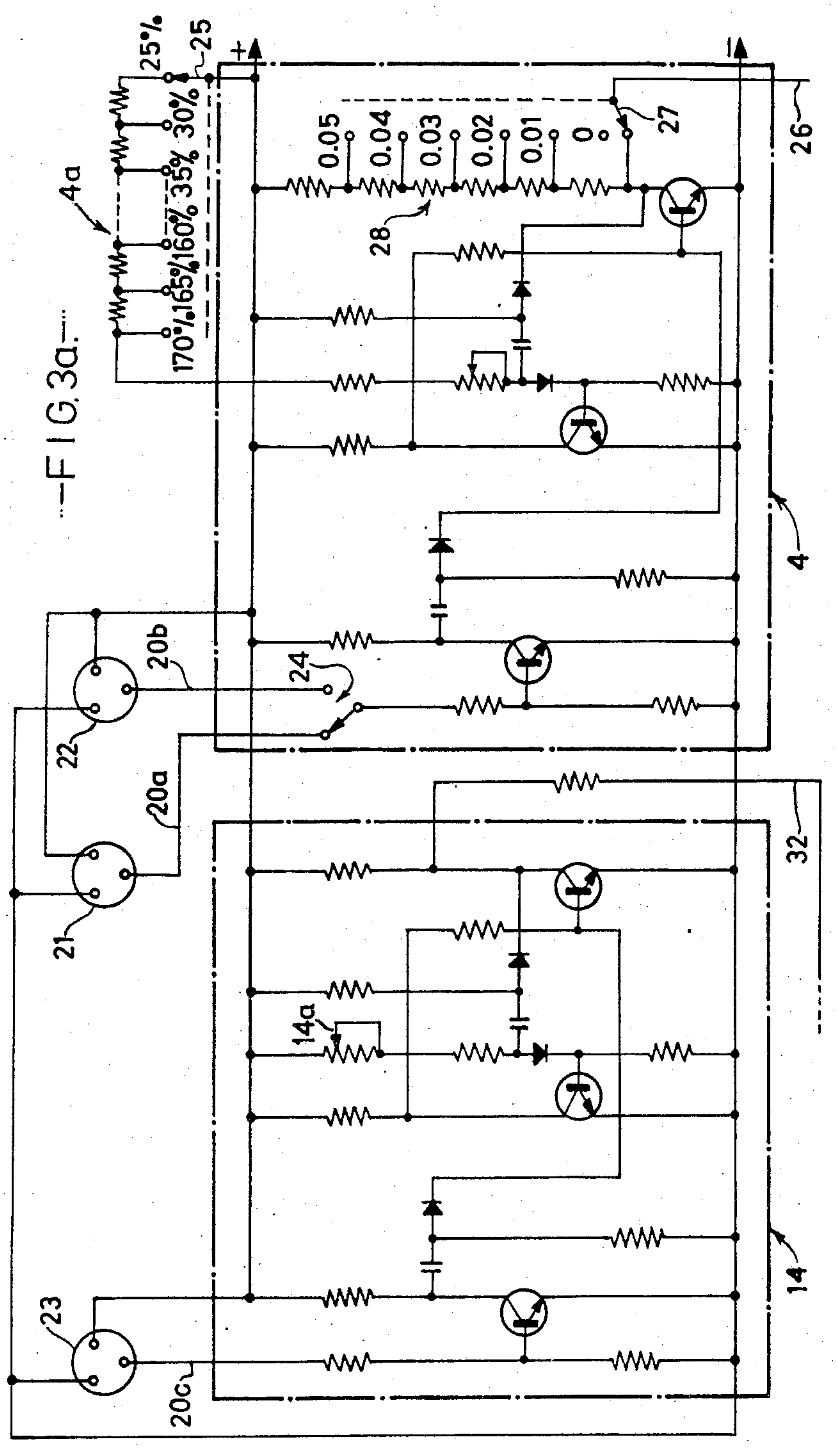
Figure 3D:
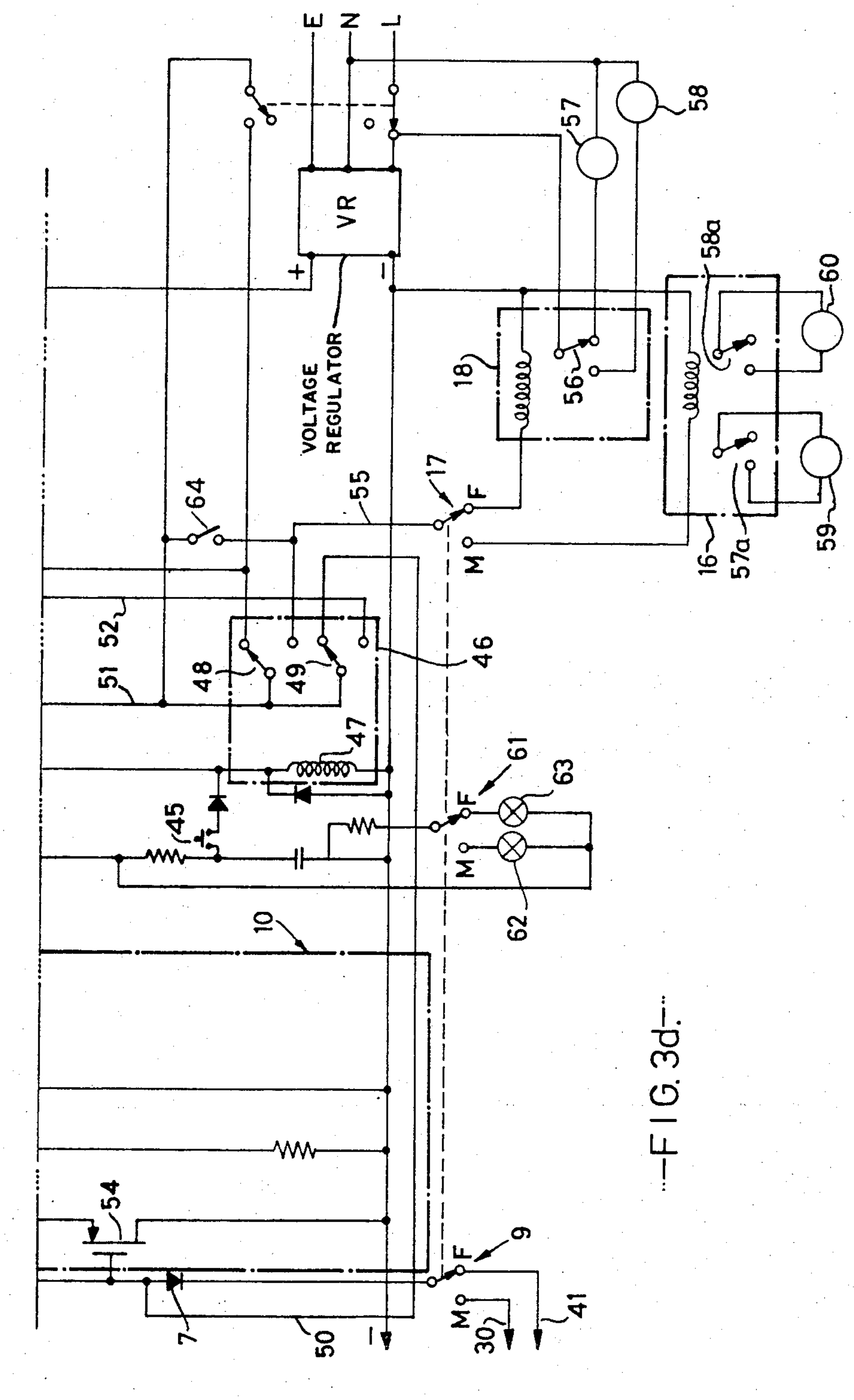
Figure 3B:
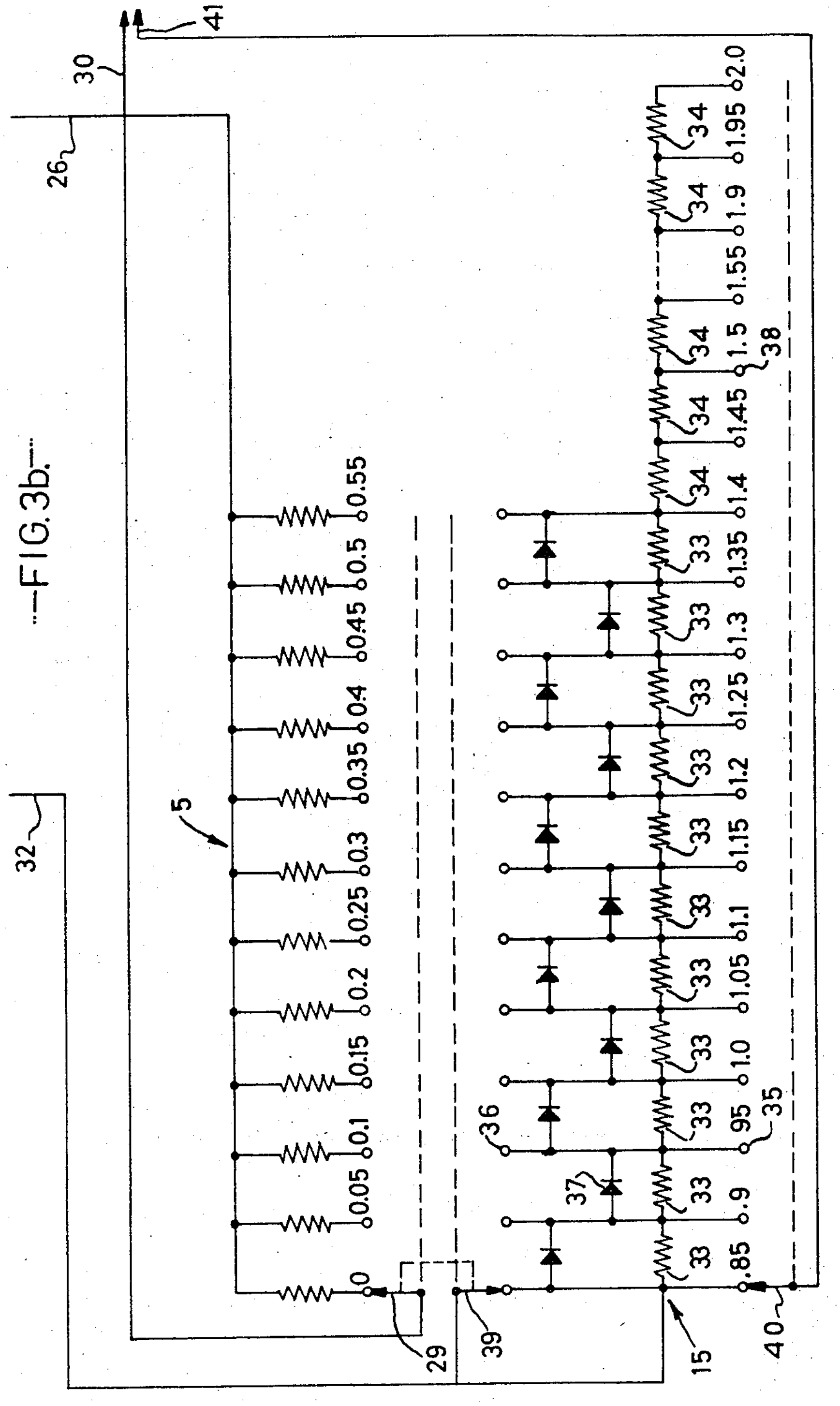
Figure 3C:
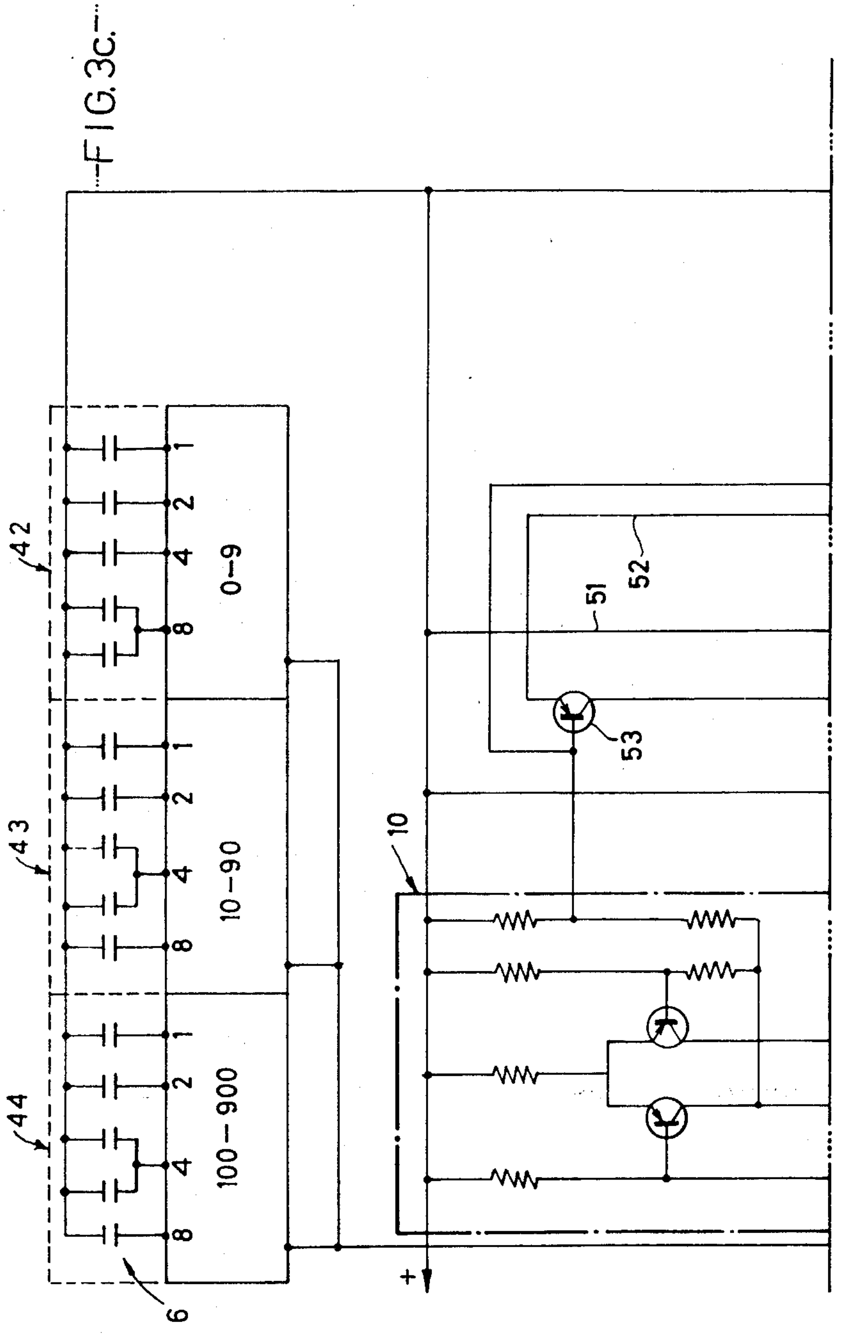
Figure 4:
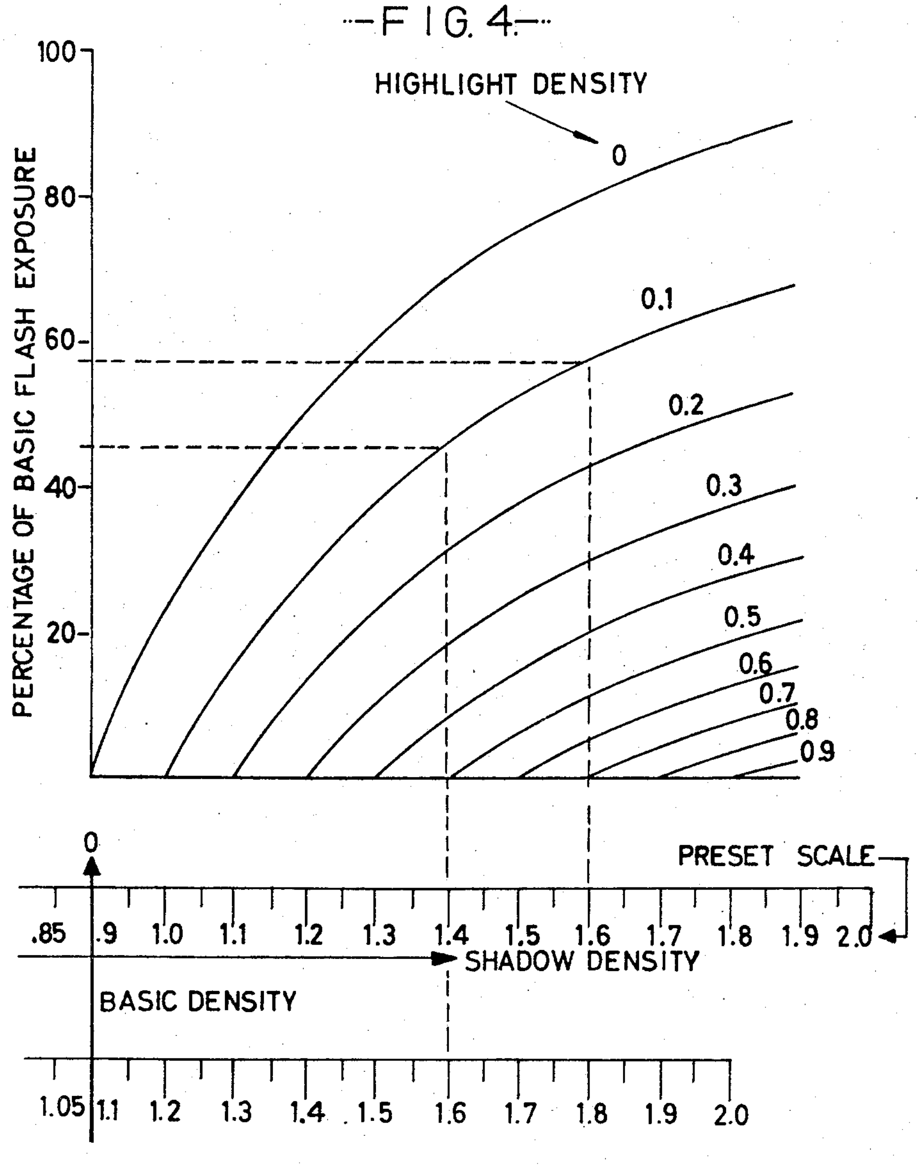

FIGS. 3*a* to 3*d* combine to form a circuit diagram of further sections of the apparatus shown in FIG. 1; and FIG. 4 illustrates the relationship between the flash exposure and the shadow and highlight densities characteristic of the controller illustrated in FIGS. 1 to 3.

Referring to FIG. 1, a first photocell 1 is positioned to receive light from graphic matter placed on the copy board of a process camera. The light passes through intensity control means 2, which may be two polarized sheets mounted for pre-settable mutual rotation or may be a graduated density wedge. The photocell 1 is associated with a Schmitt trigger circuit 3 forming a first pulsing circuit which provides output pulses at a frequency dependent on the intensity of the light impinging on the photocell. The pulses from the Schmitt trigger circuit are passed to a monostable multivibrator pulse shaping circuit 4 which converts the pulses from the trigger circuit into pulses of rectangular form. Associated with the pulse shaping circuit 4 is a variable resistor 4*a* which is manually adjustable in accordance with the required magnification or reduction of the graphic matter on the copy board. This resistor acts to control the width of the rectangular pulses produced by the pulse shaping circuit 4. An adjustable capacitor bank 6 is adapted for charging at a rate determined by the frequency, duration and height of such pulses, through an adjustable resistor bank 5 and a diode pump 7 on opening of a switch 8 with a further switch 9 in position M. A trigger circuit 10 is adapted for operation when the voltage across capacitor bank 6 reaches a predetermined value. With a further switch 17 also in position M the trigger circuit operates a relay 16 which controls the copy board lights and/or the shutter of the process camera. The resistor bank 5 is manually adjustable in relation to the highlight density of the graphic matter to be copied. The capacitor bank 6 is manually adjustable in accordance with the quantity of light needed for desired exposure of the film in the process camera.

A second photocell 11 is positioned to receive light from the flashlight used for the flash exposure of the film in the process camera. The photocell 11 may conveniently be mounted on or adjacent to or inside the back of the process camera. The photocell 11 may optionally also receive a light through crossed polarized plates or a graduated density wedge 12. The photocell 11 is associated with a Schmitt trigger circuit 13 forming a second pulsing circuit producing output pulses having a frequency dependent on the intensity of light falling on the photocell 11. The output pulses from the circuit 13 are passed to a monostable multivibrator pulse shaping circuit 14 which shapes the pulses and provides rectangular output pulses. A variable resister 14*a* is incorporated in the pulse shaping circuit 14 for adjusting the width of the pulses. The rectangular pulses from pulse shaping circuit 14 may pass through a variable resistor bank 15 to the capacitor bank 6 when switch 9 is in position F and switch 8 is open. The capacitor bank 6 will thus be charged to operate the trigger circuit 10 as previously described and with switch 17 in position F operation of the trigger circuit 10 will operate a relay 18 controlling the flashlight and also conveniently controlling safe lights for the camera. The adjustable resistor banks 5 and 15 are interconnected as will be described in more detail.

Referring now to FIGS. 2 and 3 the circuit shown in block form in FIG. 1 will be described in more detail. As shown in FIG. 2 the photocell 1 is connected to a conventional Schmitt trigger circuit 3 which produces a train of output pulses on line 20. Three of these combined photocell and trigger circuit units are embodied in the apparatus and are shown as 21, 22 and 23 in FIG. 3*a*. Process cameras having two copy boards are known and it is convenient if a separate photocell unit is associated with each copy board. Thus, photocells 21 and 22 are each associated with a different copy board and the pulses on the output lines 20*a* or 20*b* of these units may be selected by a switch 24. The photocell and trigger circuit 23 are associated with the flashlight and provide a train of output pulses on line 20*c*.

According to the position of switch 24 the output pulses from either photocell unit 21 or 22 are applied to the input of the monostable multivibrator pulse shaping circuit 4. This circuit is again of substantially conventional form and the arrangement of the circuit will be readily evident from the drawing without further detailed description. Forming part of the circuit is a bank 4*a* of resistors comprising a set of resistors in series and a contact 25 movable to tappings between adjacent resistors. The contact 25 is preferably a rotary contact controlled manually by a knob rotating over a dial calibrated to show required magnification or reduction. Calibration is from 25 to 170 percent of full size in steps of 5 percent, as shown against the tappings onto which contact 25 is movable, and thirty such tappings are provided. By adjusting the effective resistance provided by the bank 4*a* the width of the rectangular pulses provided by the pulse shaping circuit 4 may be varied. The shaped rectangular pulses from circuit 4 are applied to an output line 26 and the height of the pulses on this line may be controlled by a variable resistor comprising a movable contact 27 movable onto different tappings between adjacent resistors in a series of resistors 28. Again the contact 27 is preferably a rotary contact manually controlled by a knob rotating over a dial calibrated to show fine control of highlight density. Calibration is from 0 to 0.05 in steps of 0.01, as shown against the tappings onto which contact 27 is movable. The pulses on line 26 pass to the resistor bank 5 which comprises a series of resistors connected in parallel. Any one of these resistors may be connected to the output from the pulse shaping circuit 4 by a movable contact 29 to vary the height of the pulse on line 30.

The flash photocell unit 23 provides pulses on output line 20*c* to the input of the monostable multivibrator pulse shaping circuit 14, the circuit of which is basically identical to the shaping circuit 4. Thus, the circuit 14 provides rectangular pulses and the width of these pulses can be varied by an adjustable resistor 14*a*. The rectangular pulses from this circuit are applied on output line 32 to resistor bank 15. This resistor bank comprises a first group of resistors connected in series between the line 32 and a second group of resistors 34, all resistors of the second group being connected in series one to another. The first group of resistors have first and second tappings such as 35 and 36 between adjacent resistors, and each resistor 33 of the first group has a diode such as 37 connected in parallel therewith. The resistors 34 of the second group have only a first tapping such as 38 between adjacent resistors. A movable contact 39 is movable over the tappings 36. The contact 29 of resistor bank 5 and the contact 39 of the resistor bank 15 are arranged so that they are commonly controlled to be moved in unison over the tappings of the two resistor banks by a knob moving over a dial calibrated to show coarse control of highlight density. Calibration is from 0 to 0.55 in steps of 0.05, the twelve different values corresponding to the twelve resistors in bank 5 as shown in FIG. 3*b*. A movable contact 40 is movable over tappings 35 and 38 and is controlled by a manually operated knob movable over a dial calibrated to show shadow density. Calibration is from 0.85 to 2.0 in steps of 0.05, the 23 different values corresponding to the 23 resistors in bank 15. The movable contact 40 is connected to an output line 41. It will be seen that the two contacts 39 and 40 operate so that the effective resistance between line 32 and line 41 is determined by the resistance placed in circuit due to the setting of movable contact 40 less resistance taken out of circuit by setting of movable contact 39. By choosing suitable values for the resistors in these banks the effective resistance between line 32 and line 41 can be made proportional to the excess density. The function of the diodes 37 will be explained later in the description.

Referring now to FIG. 3*b* it will be seen that the lines 30 and 41 are connected respectively to the M and F contacts of switch 9. The common contact of switch 9 is connected through diode pump 7 which may be connected to the capacitor bank 6. The capacitor bank 6 comprises units, tens and hundreds sections 42 to 44 each comprising a number of capacitors which may be connected into the circuit on a binary system under the control of a calibrated control wheel. Thus, light values on a scale from 1 to 999 may be set in the capacitor bank 6.

Charging of the capacitor bank 6 is controlled by a start button 45 and relay 46 having an operating coil 47 and first and second sets of contacts 48 and 49 (the latter effectively constituting the contacts 8 in FIG. 1.) With the start button 45 in the open position the diode pump 7 is connected by line 50, relay contacts 49 and line 51 to the other side of the circuit and no charging of the capacitors can take place. Momentarily closing start button 45 energizes relay 46 and contacts 49 change their position to complete a holding circuit for the coil 47 by way of line 51, contacts 49, line 52 and a conducting transistor 53. As line 7 is not connected across the circuit, the pulses on line 30 or 41, whichever has been selected by the switch 9, are applied to the capacitor bank 6. The charge in the capacitor bank thus builds up until it reaches the predetermined charge that has been set according to the light value required. When this happens the capacitor bank 6 discharges on line 54 thereby operating a conventional trigger circuit 10 to remove the bias from the base of transistor 53 and thus stopping transistor 53 from conducting. Accordingly the coil of relay 47 is de-energized and charging of the capacitor bank 6 ceases.

During the period that relay 46 has been energized, contacts 48 have made a circuit to line 55 connected to the common pole of switch 17. The F contacts of this switch are connected to relay 18 having a set of contacts 56. With this relay de-energized these contacts make a circuit to one or more camera safe lights 57. When the relay 18 is energized the contacts 56 make a circuit to a flashlight 58. The M contacts of switch 17 are connected to relay 16 having two sets of contacts 57*a* and 58*a*, and when the relay is de-energized both sets of contacts are open. When the relay is energized contacts 57*a* complete a circuit (not shown in full) to copy board lights 59 and contacts 60 complete an independent circuit (not shown in full) controlling the camera shutter 60. The circuit includes a third switch 61 ganged with switches 9 and 17 and having M and F contacts connected to indicator lights 62 and 63 respectively. The circuit also includes a focus switch 64 effective to by-pass relay 47 and apply power to whichever of relays 16 and 18 is selected by switch 17. The power for the whole of the apparatus is taken from the mains through any form of suitable voltage regulator VR.

It has already been mentioned that the values for the resistors in banks 5 and 15 are important, and of particular importance are the values of resistors 33 and 34. In conventional systems for giving first a main exposure and then a flash exposure to a film, the criterion used for calculating the flash exposure has merely been the difference between the shadow density and the highlight density, irrespective of the actual value of the highlight density. Although this has proved satisfactory for lower highlight densities, it has been found that the increased exposure necessary to cater for a higher highlight density has, when added to the flash exposure, resulted in over exposure of the half-tone negative. To compensate for this it is necessary to reduce the flash exposure time with increasing highlight density, and this, when the apparatus is on flash setting can be done by lessening the resistance in the circuit to the condensor bank 6 (i.e. the resistance between lines 32 and 41) so that this charges more quickly and thus operates the trigger circuit after a shorter interval to reduce the flash exposure time. Moving of contact 39 over the tappings 36 associated with the resistor bank 14*a* thus takes out of circuit some of the resistance in this bank according to the setting of the highlight density. The values of the resistors 33 and 34 decrease from the left hand end of the bank as seen in FIG. 3*a* towards the right hand end of the bank. Shadow density adjustments usually take place towards the right hand end of this bank, whereas highlight density adjustments occur at the left hand end of this bank, and it will thus be seen that if increases of equal value are made in the settings of the highlight density and shadow density knobs the change in highlight density will take out the greater resistance, and will thus result in a greater shortening of the flash exposure time.

It may happen that for a given set of highlight density, shadow density and basic density values the position of movable contact 40 on resistor bank 15 may lie to the left of the position of movable contact 39. This represents a very small difference between the highlight and shadow density, and no excess density, which is a condition wherein no flash exposure is required. It will readily be seen that if this occurs the diodes 37 create a closed path of virtually no resistance between contact 39 and contact 40, thereby giving instantaneous charging of the capacitor bank 6, instantaneous operation of the trigger circuit 10 and thus no flash exposure.

In order that use of the apparatus may be more readily understood, the setting up and operation of the apparatus for making half tone negatives will now be described. With no film in the process camera, the capacitor bank 6 is adjusted to a chosen light quantity, which may for example be 400, thereby allowing a good range of adjustment to either side of this value. The switches 9, 17 and 61 are placed in the M position. The contacts 27, 29, 39 and 40 are placed in their far left hand positions on the resistor banks as shown in FIGS. 3*a* and 3*b* by turning the highlight control to the zero marking on the dial, and the shadow density control to the 0.85 marking on the dial. The contact 25 is placed in the position corresponding to 100 percent of full size, i.e. no magnification on reduction, by turning the control knob to the appropriate position. A desired main exposure time is then chosen and the intensity control means 2 is adjusted until the desired exposure time, i.e. time with copyboard lights on and camera shutter open, results on operating the starter button 45.

A conventional reflection density step wedge is then placed to one side of the center line of the copy board, the camera lens stop is set at whatever value the operator prefers, and the camera is loaded with the film and half tone screen. With all settings remaining as described the start button 45 is pressed and the film exposed. The exposure time will be that which has already been decided, since the minimum highlight density on the step wedge is zero and the highlight density control is set at zero. The resulting negative is then proceessed and is examined to find which step on the wedge gives a 95 percent dot. This will probably not be the zero density step, but from observing the value of the step, and using a conventional log-lin scale it is possible to calculate exactly the light quantity needed to produce a 95 percent dot in an area of zero highlight density. The setting of the capacitor bank 6 is then adjusted to this light quantity and the light quantity needed for correct highlight exposure for the particular batch of film has thus been established and set.

With the step wedge still in position, the camera is then loaded with a further piece of film, again with the half tone screen, and the side of the film which does not receive the image of the step wedge is masked. With all settings remaining as described a further main exposure is made by pressing start button 45. The switches 9, 17 and 61 are then moved to the F position, so switching on the cameral safe light and the back of the camera is opened. The mask is then moved to cover the exposed side of the film. The operator chooses a flash exposure time that will be roughly acceptable. And by moving further masking material over the unexposed part of the film and manually operating the focus switch 64, bands of this part of the film are exposed to the flash light for varying periods of time of known duration. The film is then processed, and it can be checked in the step wedge part of the film that in fact the 95 percent dot occurs at zero highlight density. The flash bands on the film are then examined to establish which band contains the 95 percent dot, and the flash exposure time needed to obtain this band is noted. With the switches 9, 17 and 61 still in the F position, the capacitor bank 6 still set to the predetermined light quantity value, the magnification and highlight density controls unchanged, and with the shadow density control moved to the 2.0 (far right hand) position the resistance 31 is adjusted until the flash time obtained by pressing the start button 45 is equal to the time required for giving the band with the 95 percent dot.

The step wedge image on the negative is then examined to find the value of the band which provides a 5 percent dot. The difference in the values of the bands giving 95 and 5 percent dots is then calculated to give the basic density of the film. The shadow density control knob is returned to its 0.85 position, and is then loosened on its spindle and is turned to the setting equal to the basic density. The knob is then once again tightened onto the spindle. The value of the resistance in bank 15 at any given setting may thus not correspond to that directly related to the indication given by the dial, but is modified according to the basic density of the film. The exposure controller is now set for making half tone negatives with the particular batch of film.

To make a half tone negative the graphic matter to be copied is placed on the copy board and the highlight and shadow density values are measured using a reflection density step wedge or reflection densitometer. The highlight density and shadow density control knobs are then moved to the appropriate settings on the dial so changing the settings of the movable contacts 29, 39 and 40. Fine control of highlight density may also be adjusted by the knob controlling contact 27. The required magnification is set by moving the knob controlling contact 25. The required light quantity has already been set in the initial setting up. With these settings, and with the switches 9, 17 and 61 in the M position, the start button 45 is pressed, relay 46 operates so that the copyboard lights come on and the camera shutter opens, the capacitor bank 6 charges at the rate controlled by the various resistances and the capacitor bank operates the trigger circuit after the required period to close the camera shutter and extinguish the copy board lights. The main exposure is thus completed and the camera back is opened after the switches 9, 17 and 61 have been moved to the F position so that the safe light is switched on. The start button 45 is then pressed again and the capacitor bank controls the length of time for which the flash lamp is operative. After this flash exposure the film may be removed for processing and the camera reloaded for a further exposure.

After the initial setting up of the apparatus it is found that good results can be consistently obtained merely by setting the knobs to the desired values and by pressing the start button, a much simpler technique for the operator than that involved in previous methods of working with process cameras.

It will be understood that the only density value affecting the main exposure time is highlight density, but the flash exposure time is affected by both shadow and highlight density. The necessary compensation in flash exposure time for increasing hightlight density is thus built in to the apparatus and does not require any skill on the part of the operator.

The graph shown in FIG. 4 illustrates the characteristics of the apparatus in half tone work, and shows the percentage of basic flash exposure time that is given for any given combination of highlight and shadow densities at the indicated basic density of 0.9. For example, given a highlight density of 0.1 and a shadow density of 1.6 the flash exposure time will be just under 60 percent of the basic time. If a change in basic density occurs the shadow density scale must be moved until the appropriate basic density value lies on the y-axis. Thus, for a basic density of 1.1, the highlight and shadow density figures given would result in a flash exposure of about 45 percent of the basic time.

From the foregoing description, one skilled in the art will readily understand how the apparatus may be used in the much simpler technique of producing line negatives.

It has already been mentioned that apparatus according to the invention can be used to control exposure in a contact printing box. In this case the apparatus is much simpler than that shown in the drawings since only highlight density variation must be taken into account, and there is only one light source to control. Thus, the apparatus will comprise a single photocell and Schmitt trigger circuit unit 3, the pulses from which are fed to a single pulse shaping circuit 4 having the fine highlight density control resistors 28, but no magnification control resistor bank 4*a*. The output from the circuit 4 is taken to the main highlight density control resistor bank 5, and the output on line 30 from this bank is taken directly to the diode pump 7. The capacitor bank 6, trigger circuit 10 and control circuit for relay 46 are all as shown in FIG. 3*b*, but line 55 leads directly to a single relay controlling the light source for the exposure and a safe light. Thus, all parts of the circuit concerned with flash exposure control and with shadow density adjustment are omitted.

Operation of the modified apparatus is, of course, analagous to that already described. Highlight density is measured and set on the knob controlling resistor bank 5 and the start button 45 is pressed. The relay 46 is thus latched in and causes the exposure light source to be switched on. The capacitor bank 6 changes at a rate dependent on the light incident on the photocell and the setting in resistor bank 5, and discharges at the value set in accordance with the characteristics of the material being exposed. Trigger circuit 10 then cuts out relay 46 so that the exposure light source is extinguished and the safe light comes on.

The simplified apparatus just described for controlling exposure in a contact printing box may be modified by including the magnification control resistor bank in the circuit, and the resulting apparatus can then be used for controlling exposure in an enlarger.

It will be understood that the particular circuit shown in FIGS. 2, 3*a* and 3*b* can be varied. The pulsing circuit, pulse shaping circuits and trigger circuits shown are all conventional and may be replaced by any other suitable circuits. The particular number and arrangement of resistors and capacitors may be varied, and different ways of interlocking the banks 5 and 15 may be used.

What I claim is:

1. Apparatus for controlling the exposure of a photosensitive material to light, comprising an electrical pulsing circuit capable of producing voltage pulses, a photocell responsive to the intensity of the light to control the pulsing circuit so that the frequency of the pulses is dependent on the intensity of the light, a capacitor which is manually adjustable to a predetermined value in accordance with the quantity of light needed for desired exposure of the material, first control resistor through which said pulses may be applied to charge said capacitor, said control resistor being manually adjustable in accordance with a given parameter, manually operable switching means to initiate exposure of said material to light and simultaneously to commence charging of said capacitor through said control resistor by said pulses, and trigger means operative to stop said exposure when the charge in said capacitor reaches said predetermined value.

2. Apparatus according to claim 1, for controlling primary exposure in a process camera, in which the parameter according to which said first control resistor is manually adjusted is the highlight density of graphic matter to be copied.

3. Apparatus according to claim 1, for controlling flash exposure in a process camera, in which the parameter according to which said first control resistor is manually adjusted is the excess density of graphic matter to be copied.

4. Apparatus according to claim 1, for controlling both primary and flash exposure in a process camera, comprising a first electrical pulsing circuit capable of producing voltage pulses, a first photocell responsive to the intensity of the light during primary exposure to control the first pulsing circuit so that the frequency of the pulses is dependent on the intensity of the light, a first control resistor for said first pulsing circuit, said first control resistor being manually adjustable in accordance with the highlight density of graphic matter to be copied to shape the pulses in a train of output pulses from said first pulsing circuit; a second pulsing circuit capable of producing voltage pulses of duration compatible with those produced by the first pulsing circuit, a second photocell responsive to the intensity of light during flash exposure to control the second pulsing circuit so that the frequency of the pulses is dependent on the intensity of the flash light, a second control resistor for said second pulsing circuit, said second control resistor being manually adjustable in accordance with the excess density of the graphic matter to shape the pulses in a train of output pulses from said second pulsing circuit; a capacitor which is manually adjustable to a predetermined value in accordance with the quantity of light needed for desired exposure of the material, switch means for selecting the shaped train of output pulses from either said first or said second pulsing circuit to charge said capacitor manually operable switching means to initiate exposure of said material to light and simultaneously to commence charging of said capacitor by the selected train of output pulses, and trigger means operative to stop said exposure when the charge in said capacitor reaches said predetermined value.

5. Apparatus according to claim 2 in which said electrical pulsing circuit includes a circuit element which is manually adjustable in accordance with the required magnification or reduction of the graphic matter to control the shape of the voltage pulses produced by said pulsing circuit.

6. Apparatus according to claim 5 in which said electrical pulsing circuit is designed to produce substantially rectangular pulses and said circuit element controls the width of the pulses.

7. Apparatus according to claim 6 in which said electrical pulsing circuit includes a third control resistor which is manually adjustable to give fine control of the highlight density of the graphic matter and which is operative to control the height of the voltage pulses produced by said pulsing circuit.

8. Apparatus according to claim 7 in which said third control resistor is a set of resistors in series, and an output contact movable to a tapping between any two adjacent resistors.

9. Apparatus according to claim 5 in which said circuit element is a fourth control resistor comprising a set of resistors in series and a contact movable to a tapping between any two adjacent resistors.

10. Apparatus according to claim 4 in which said first electrical pulsing circuit includes a circuit element which is manually adjustable in accordance with the required magnification or reduction of the graphic matter to control the shape of the voltage pulses produced by said first pulsing circuit.

11. Apparatus according to claim 10 in which said first electrical pulsing circuit is designed to produce substantially rectangular pulses and said circuit element controls the width of the pulses.

12. Apparatus according to claim 11 in which said first electrical pulsing circuit includes a third control resistor which is manually adjustable to give fine control of the highlight density of the graphic matter and which is operative to control the height of the voltage pulses produced by said first pulsing circuit.

13. Apparatus according to claim 12 in which said third control resistor is a set of resistors in series, and an output contact movable to a tapping between any two adjacent resistors.

14. Apparatus according to claim 10 in which said circuit element is a fourth control resistor comprising a set of resistors in series and a contact movable to a tapping between any two adjacent resistors.

15. Apparatus according to claim 1 in which said control resistor is a bank of resistors connected in parallel, any one resistor of the bank being connectable between said pulsing circuit and said capacitor by a movable contact.

16. Apparatus according to claim 4 in which said first control resistor is a bank of resistors connected in parallel, any one resistor of the bank being connectable between said first pulsing circuit and said capacitor by a movable contact.

17. Apparatus according to claim 1 in which more than one primary exposure photocell is provided and the electrical pulsing circuit includes a switch for selecting any desired one of said primary exposure photocells to control the frequency of the pulses.

18. Apparatus according to claim 1 in which said photocell has adjustable filter means associated therewith.

19. Apparatus according to claim 3 in which the second control resistor is a set of resistors connected in series and an output contact movable to a tapping between any two adjacent resistors.

20. Apparatus according to claim 4 in which the second control resistor comprises a first group of resistors in series connected in series to a second group of resistors in series, the first group having first and second tappings between adjacent resistors and the second group having only a first tapping between adjacent resistors, the control means for the first control resistor and settable in accordance with highlight density also controls an input contact movable over the second tappings, and independent control means settable in accordance with shadow density controls an output contact movable over the first tappings.

21. Apparatus according to claim 20 in which the independent control means is a knob on a spindle directly connected to the output contact, the knob being movable over a dial calibrated to show shadow density, and the knob can be released from the spindle and rotated independently thereof to compensate the setting of the output contact in accordance with the basic density of the photosensitive material.

22. Apparatus according to claim 20 in which the values of the resistors in the first group are higher than the values of the resistors in the second group.

23. Apparatus according to 20 in which each resistor in the first group has a diode connected in parallel therewith creating a short circuit between the input and output contacts if the input contact is on a tapping closer to the second group of resistors than the tapping that the output contact is on.

24. Apparatus according to claim 1 in which the manually operable switching means is a push button for energizing a relay having a holding circuit, the relay having contacts closable to initiate said exposure, and the trigger means is operative to break the holding circuit to the relay when the charge in said capacitor reaches said predetermined value.

25. Apparatus according to claim 4 in which the manually operable switching means is a push button for energizing a relay having a holding circuit, the relay having contacts closable to initiate said exposure, and the trigger means is operative to break the holding circuit to the relay when the charge in said capacitor reaches said predetermined value.

26. Apparatus according to claim 25 in which the switch means for selecting the train of output pulses from either the first or second pulsing circuits is also effective, when the pulses from the first circuit are selected, to connect the closable contacts of the relay to a relay controlling the shutter of the process camera, and when the pulses from the second circuit are selected, to connect the closable contacts of the relay to a relay controlling a flash lamp.

27. Apparatus according to claim 26 in which the shutter control relay also controls the switching on and off of the lights for the primary exposure.

28. Apparatus according to claim 26 in which the flash lamp control relay also controls a safe light so that the safe light is on when the flash light is off and vice versa.

29. Apparatus according to claim 20 and including a switch for bypassing the relay to energize either the shutter control relay or the flash lamp control relay independently of the control circuits.

* * * * *